United States Patent [19]

Peterson et al.

[11] Patent Number: 5,308,148

[45] Date of Patent: May 3, 1994

[54] SEAT BELT MODULE ASSEMBLY

[75] Inventors: Jeffrey E. Peterson, Indianapolis; Niels Dybro, Carmel; Ronald F. Homeier, Plainfield; Allan R. Lortz, Noblesville, all of Ind.

[73] Assignee: Indiana Mills and Manufacturing, Inc., Westfield, Ind.

[21] Appl. No.: 950,908

[22] Filed: Sep. 24, 1992

[51] Int. Cl.⁵ ............................................. A62B 35/00
[52] U.S. Cl. .................................. 297/468; 297/474; 297/476; 297/485
[58] Field of Search ....................... 297/468, 474–476, 297/482, 485

[56] References Cited

U.S. PATENT DOCUMENTS

| | | | |
|---|---|---|---|
| 3,248,148 | 4/1966 | Board et al. | 297/476 |
| 3,304,119 | 2/1967 | Boedigheimer | 297/476 |
| 3,549,203 | 12/1970 | Rawson | 297/476 |
| 3,583,764 | 6/1971 | Lohr | 297/475 |
| 3,645,549 | 2/1972 | Jantzen | 297/474 X |
| 3,981,519 | 9/1976 | Cataldo | 297/474 |
| 4,037,873 | 7/1977 | Weman | 297/475 |
| 4,238,135 | 12/1980 | Sandham | 297/468 |
| 4,305,618 | 12/1981 | Molnar | 297/476 |
| 4,431,233 | 2/1984 | Ernst | 297/468 |
| 4,919,484 | 4/1990 | Bougher et al. | 297/474 |
| 5,031,961 | 7/1991 | Isern | 297/468 X |

*Primary Examiner*—Peter M. Cuomo
*Assistant Examiner*—Suzanne L. Dino
*Attorney, Agent, or Firm*—Woodard, Emhardt, Naughton, Moriarty & McNett

[57] ABSTRACT

A seat belt assembly includes a tongue, a buckle, a frame mountable to a vehicle seat, linking articles for linking the tongue and buckle to the frame, a retractor assembly operable to pay out and retract linking articles connected with said tongue, the tongue thereby extendable from a retracted position to an extended position lockingly engaged with said buckle. The tongue, buckle, linking articles and retractor assembly are all mounted in operable combination to the frame, the resulting frame means combination being mountable as a unit to a vehicle seat. The seat belt assembly also includes tongue and buckle sleeve assemblies which are mountable to the frame and which cover the linking articles in the retracted position, and which support the tongue and the buckle in a desired user access position.

2 Claims, 5 Drawing Sheets

SEAT BELT MODULE ASSEMBLY

FIELD OF THE INVENTION

This invention relates to the field of seat belt devices, and more particularly to a seat belt module assembly adapted to be mounted as a one-piece unit to a vehicle seat.

BACKGROUND OF THE INVENTION

Seat belts in present day vehicles typically comprise a number of individual components which are separately mounted to the vehicle in different locations. For example, a buckle assembly may be mounted on the right-hand side of a vehicle seat, while the retractor for the tongue assembly may be mounted on the left side of the seat to the vehicle's floor, side or door. Additional guides or limit mechanisms may be mounted to the tongue assembly or separately thereof for engagement with the webbing of the tongue to limit, control or position the webbing as most comfortable for the wearer. Such system therefore generally require mounting of several individual pieces to the vehicle's seat, body or door.

What is needed is a seat belt assembly which streamlines and simplifies the seat belt mounting, repair and replacement procedure.

SUMMARY OF THE INVENTION

For those vehicles which provide access to the underneath area of the vehicle's seat, the present invention generally provides a seat belt module assembly whereby the majority of components are pre-assembled and mutually interconnected, thereby allowing attachment to a vehicle seat of a one-piece assembly.

Generally speaking, a seat belt assembly includes a tongue, a buckle, a frame mountable to a vehicle seat, linking articles for linking the tongue and buckle to the frame, and a retractor assembly operable to pay out and retract linking articles connected with the tongue, the tongue thereby extendable from a retracted position to an extended position lockingly engaged with the buckle. The tongue, buckle, linking articles and retractor assembly are all mounted in operable combination to the frame, the resulting frame combination being mountable as a unit to a vehicle seat. The seat belt assembly also includes tongue sleeve and buckle sleeve assemblies which are easily mountable to the frame, which cover the linking articles in the retracted position, and which support the tongue and the buckle in a desired user access position.

It is an object of the present invention to provide an improved seat belt assembly.

It is another object of the present invention to provide a seat belt assembly which is easier to install, repair or replace.

Further objects and advantages of the present invention will become apparent from the following description of the preferred embodiment.

DESCRIPTION OF THE PREFERRED EMBODIMENT

For the purposes of promoting an understanding of the principles of the invention, reference will now be made to the embodiment illustrated herein and specific language will be used to describe the same. It will nevertheless be understood that no limitation of the scope of the invention is thereby intended, any alterations, modifications and further applications of the principles of the invention being contemplated as would normally occur to one skilled in the art to which the invention relates.

Figure 1:
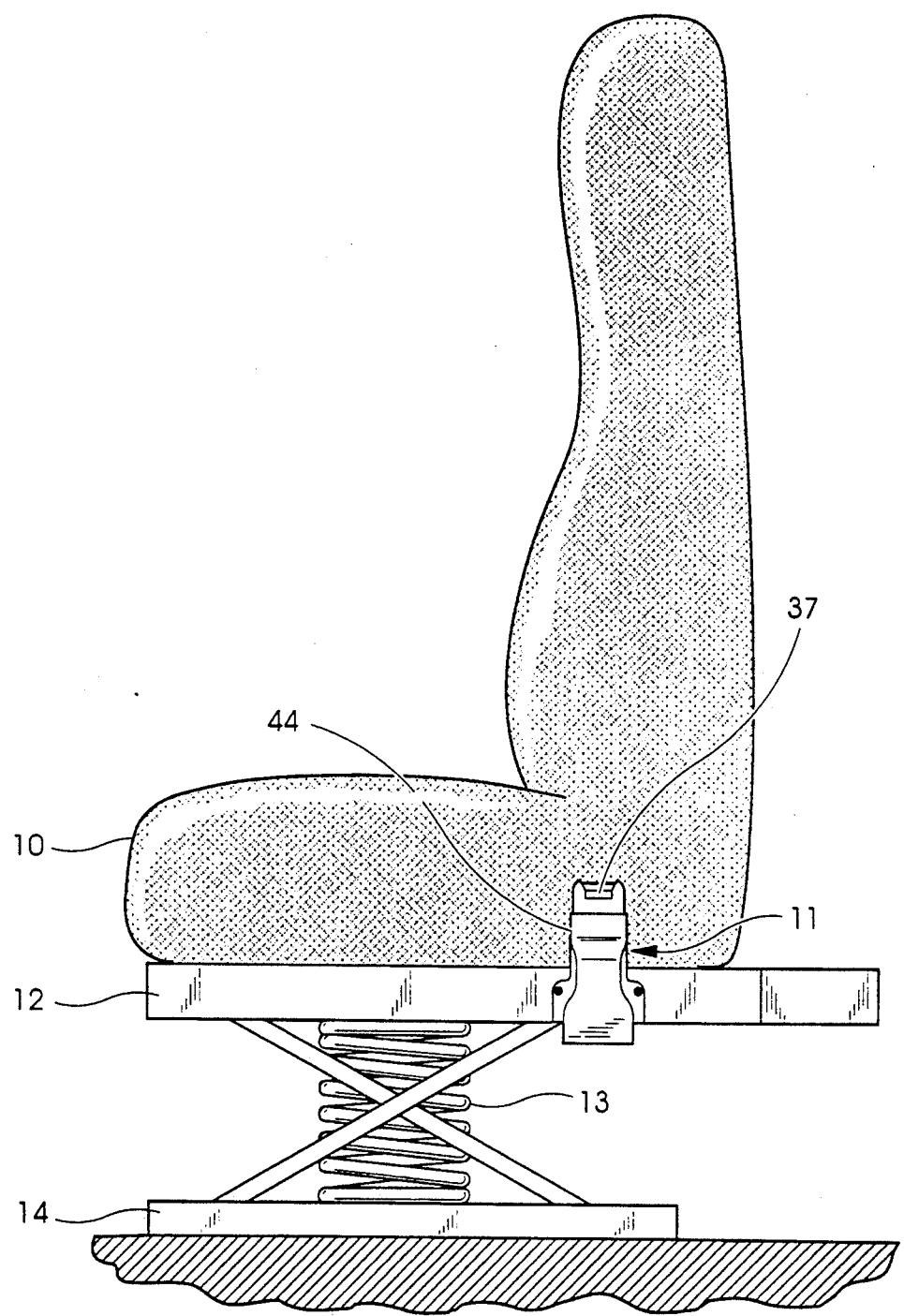
FIG. 1 is a side elevational view of a seat belt module assembly connected with a vehicle seat in accordance with the preferred embodiment of the present invention.

Referring to FIG. 1, there is shown a vehicle seat 10 equipped with a seat belt module assembly 11 in accordance with the preferred embodiment of the present invention. In this embodiment, seat 10 is mounted atop a seat frame 12 in turn movably mounted to the frame of the vehicle. Conventional means are provided to allow frame 12 to be horizontally and vertically adjusted relative to the vehicle to properly position the driver or passenger. In rough riding vehicles, conventional cushion means 13 is provided between seat frame 12 and the floor 14 of the vehicle. The conventional cushion means 13 may take the form of a spring which absorbs vertical shock allowing the seat to remain relatively vertically stationary as floor 14 moves vertically. Seat belt module assembly 11 is connected to seat frame 12, as shown, providing the user access to the buckle 44 and tongue (not shown in FIG. 1). It should be understood that the size and placement of assembly 11 will vary with the configuration of the seat 10 and frame 12 to which assembly 11 will be attached.

Figure 2:
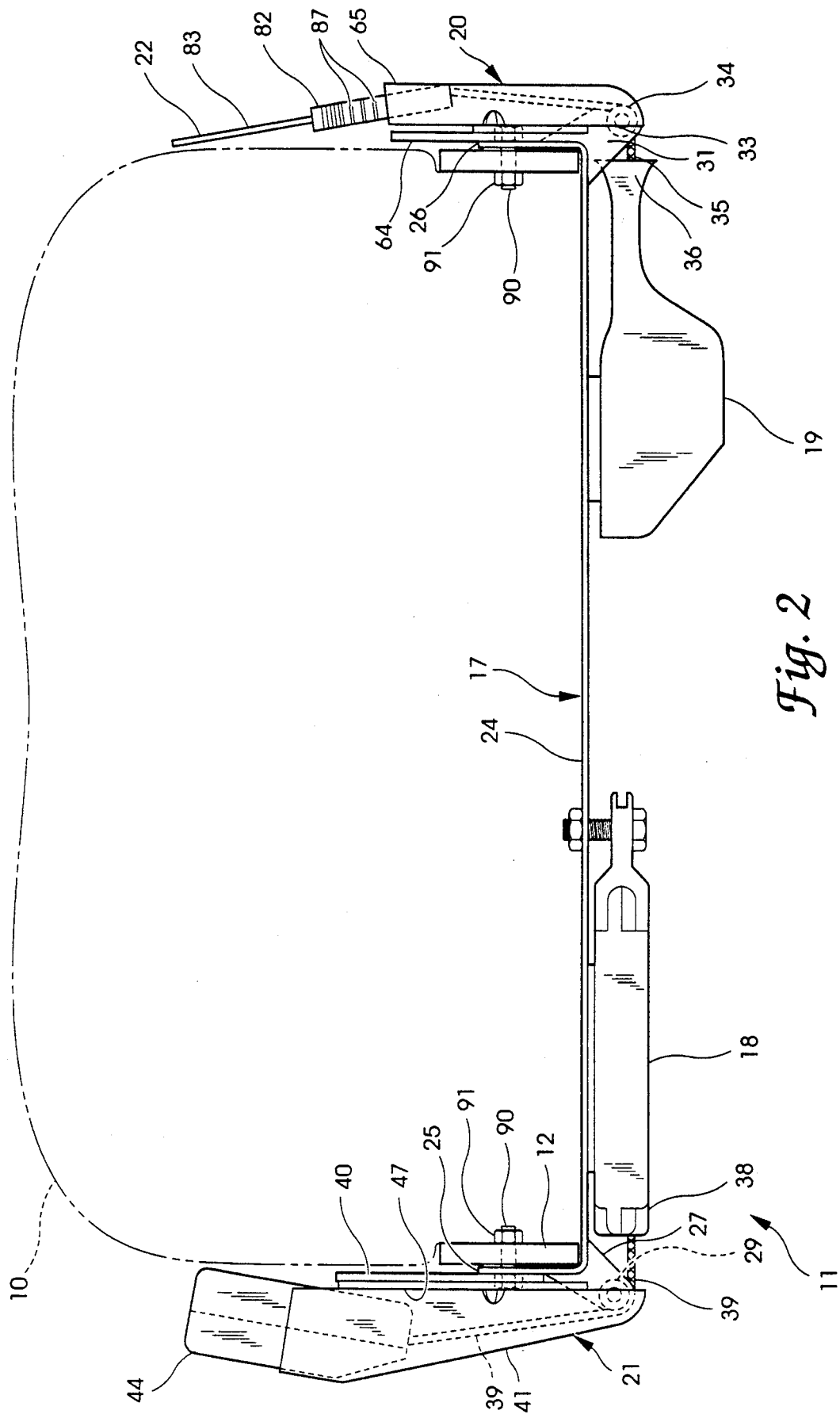
FIG. 2 is a rear elevational view of the seat belt module assembly of FIG. 1.
Figure 3:
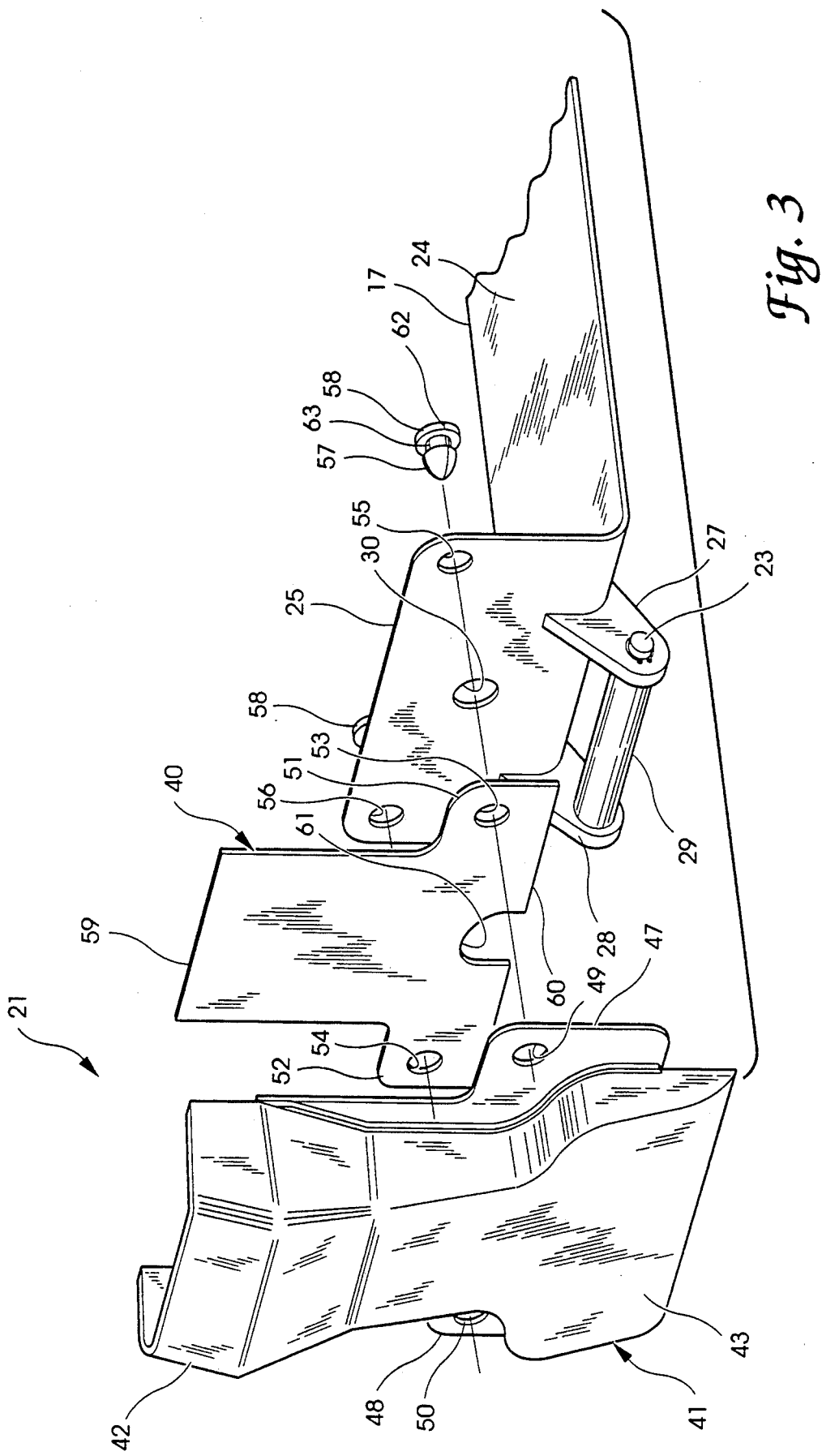
FIG. 3 is an exploded perspective view of a portion of the seat module assembly of FIG. 2 showing the buckle sleeve assembly 21.
Figure 4:
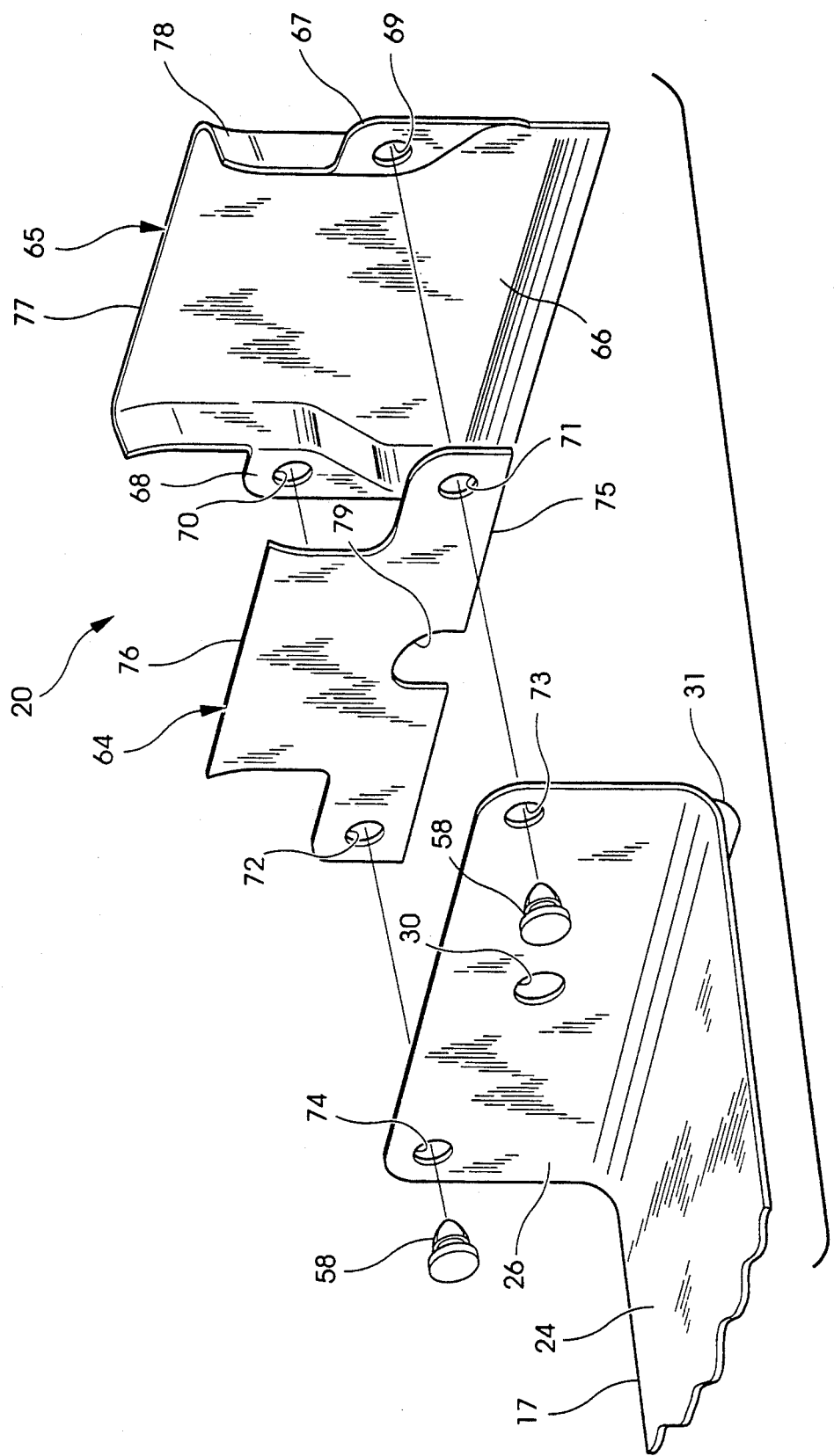
FIG. 4 is an exploded perspective view of a portion of the seat belt module assembly of FIG. 2 showing the tongue sleeve assembly 20.
Figure 5:
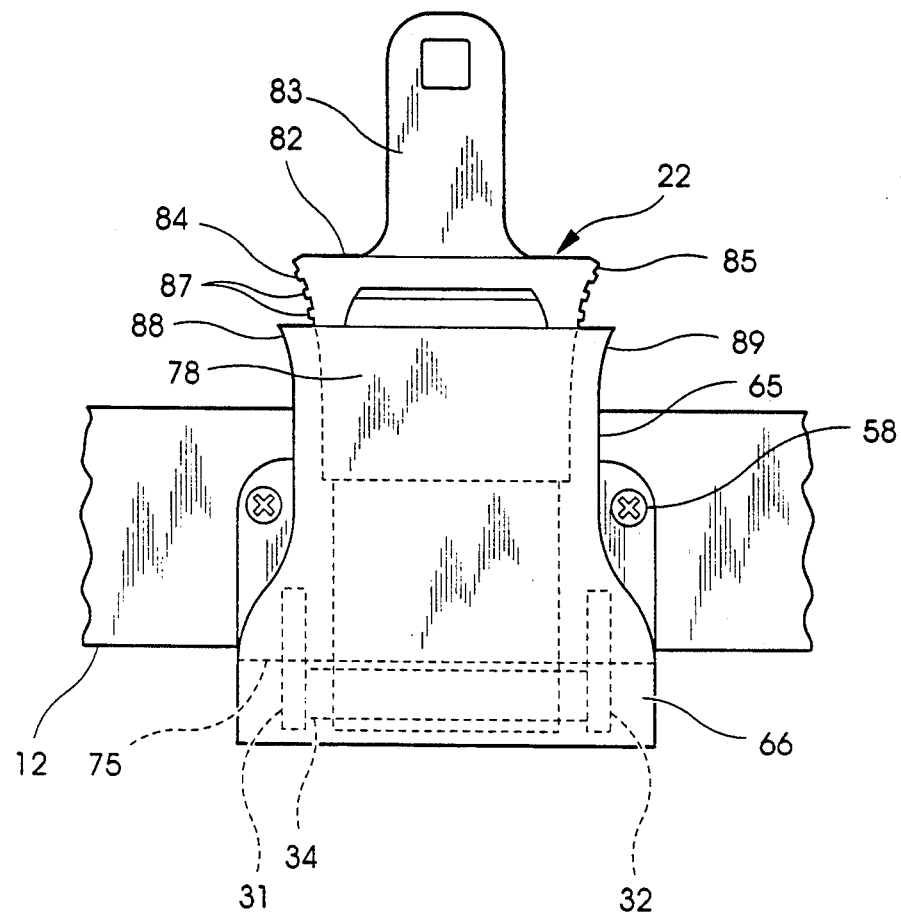
FIG. 5 is a side view of the seat belt module assembly of FIG. 2 showing the tongue 22 and tongue sleeve assembly 20.

Referring now to FIGS. 2 through 4, assembly 11 generally includes a frame 17, a tensioning system assembly 18, a conventional retractor assembly 19, a buckle sleeve assembly 21 and a tongue sleeve assembly 20. Frame 17 is a generally U-shaped member having a flat, elongated central portion 24 and legs 25 and 26 extending orthogonally upwardly from opposing ends of central portion 24. Legs 24 and 25 each define a central seat mounting hole 30. A pair of spaced apart brackets 27 and 28 (FIG. 3) extend downwardly and outwardly from frame 17 at the junction of central portion 24 and leg 25. A roller 29 is supported for rotation by an axle 23 which is supported at its ends by and between brackets 27 and 28. Axle 23 is held in position by appropriate means such as by snap rings. A similar pair of brackets 31 and 32, an axle 33 and a roller 34 are disposed at the opposite end of frame 17 (FIGS. 2 and 5).

Retractor assembly 19 includes a seat belt retractor operable to retract and pay out seat belt webbing 35. The retractor may be a conventional retractor or may take the form of an anti-cinch automatic locking retractor, such as shown in the commonly owned U.S. Pat. No. 4,911,377 which is herewith incorporated by reference. The latter retractor includes a pawl mounted to a carrier movably mounted to the retractor frame to permit limited retraction of the belt even though the pawl is locked. Assembly 19 is mounted to the underside of central portion 24 with the flared open end 36 positioned close to roller 34. Seat belt webbing 35 extends outwardly from flared end 36, around roller 34 as described herein, to its terminal connection to tongue 22.

Tensioning system assembly 18 is of the type described in U.S. Pat. No. 4,919,484 which is hereby incorporated by reference. Assembly 18 essentially provides a mechanism to offset the tendency of the retractor assembly 19 to collect all of the slack of the belt during a bumpy ride, thereby working to keep the belt from cinching down on the wearer. Assembly 18 is mounted to the underside of central portion 24 with the leading end 38 positioned close to roller 29. Seat belt webbing 39 extends outwardly from leading end 38, around roller 29 as described herein, to its terminal connection to a buckle 44. Buckle 44 is a conventional end release buckle meaning that the release button 37 (FIG. 1) is at an edge of the buckle rather than at its center.

Buckle sleeve assembly 21 includes an inner plate 40 and a cover 41. Cover 41 is made of molded plastic and defines a shaped upper buckle receiving portion 42 and an enlarged lower portion 43, the latter portion 43 sized and shaped to enclose a good deal of the combination of brackets 27 and 28 and roller 29 (FIG. 2). Upper portion 42 is sized and shaped to loosely receive the lower portion of a buckle 44, as shown in FIG. 2. A pair of mounting ears 47 and 48 extend outwardly from opposing sides of cover 41. Ears 47 and 48 define mounting holes 49 and 50, respectively. Inner plate 40 is generally rectangular with a pair of opposed, outwardly extending ears 51 and 52, each of which defines a mounting hole 53 and 54, respectively. Ears 51 and 52 and their holes 53 and 54 substantially correspond with and align with ears 47 and 48 and their holes 53 and 54. Leg 25 of frame 17 likewise defines a pair of holes 55 and 56 which are alignable with holes 53 and 54 and 49 and 50, respectively.

In assembly, cover 41, plate 40 and leg 25 are sandwiched and fixed together with appropriate fasteners 58 disposed through aligned holes 49, 53 and 55 and holes 50, 54 and 56. Cover 41 and plate 40 thereby form a sleeve mounted to leg 25 and adapted to receive webbing 39 therethrough. In one embodiment, fasteners 58 may be of the type shown in FIG. 3, that is, made of a resistant plastic with a slitted, tapered leading end 57, a base 62, and a reduced diameter section 63 extending therebetween. This configuration allows a fastener 58 to be pushed through holes 55, 53 and 49 when leg 25, plate 40 and cover 41 are sandwiched together, the slitted tapered end 57 compressing radially until completely through and past holes 55, 53 and 49, where end 57 springs back to its normal shape, locking leg 25, plate 40 and cover 41 together. Other configurations for a fastener 58 are contemplated such as a bolt and nut combination. In another embodiment, the fastener is fixedly attached or formed as an integral part of leg 25. Plate 40 and cover 41, either individually or as a unit, is snapped thereto, or positioned thereagainst, either individually or as a unit, while a nut or other appropriate fastener is secured in place. The height of plate 40 (measured between top edge 59 and holes 53 and 54) is set, relative to the shape of upper portion 42 and of buckle 44 so that buckle 44 will sit partially within upper portion 42 as shown in FIG. 2. The bottom edge 60 is defined a distance below holes 53 and 54 so as to be just above brackets 27 and 28 when plate 40 is sandwiched against leg 25, and holes 53 and 55 and holes 54 and 56 are aligned. A U-shaped slot 61 is defined in the middle of the bottom of plate 40. Slot 61 is sized to be larger than the head of a bolt which extends through hole 30 and an aligned hole (not shown) in seat frame 12 to fasten assembly 11 to seat 10. Slot 61 thereby allows plate 40 to be attached to leg 25 either before or after frame 17 is fixed to seat frame 12.

At the opposite end of frame 17, tongue sleeve assembly 20 is similarly configured with an inner plate 64 and a cover 65 (FIGS. 2 and 4). As with assembly 21, cover 65 has an enlarged lower portion 66 and opposing mounting ears 67 and 68, each with mounting holes 69 and 70 which align with holes 71 and 72 of plate 64 and holes 73 and 74 of leg 26, respectively. Plate 64 is sized so that, when plate 64 is sandwiched between leg 26 and cover 65 with holes 69, 71 and 73 and holes 70, 72 and 74 aligned, lower edge 75 is disposed above brackets 31 and 32 (FIGS. 2 and 5) and upper edge 76 is level with the upper edge 77 of cover 65. The latter spacing of upper edge 76 relative to upper edge 77 may vary with the particular size and shape of the flared upper end 78 of cover 65 and of the tongue 22 to provide the most favorable fit between tongue 22 and sleeve assembly 20. Plate 64 also defines a U-shaped, bolt-clearance slot 79 in the middle of the bottom of plate 64. Appropriate fasteners 58 likewise secure leg 26, plate 64 and cover 65 together via aligned holes 69, 71 and 73 and holes 70, 72 and 74.

Referring to FIG. 5, tongue 22 comprises a grip 82 and a tongue plate 83. Grip 82 is made of a material such as molded plastic. Grip surfaces 84 and 85 are defined at the opposing sides of grip 82, and arc upwardly and outwardly, as shown, with ridges 87 defined therein. At the upper end 78 of cover 65, the opposing sides flare slightly outwardly at 88 and 89. The largest outer width of grip 82 is larger than the largest inner width of flared upper end 78, thereby providing a somewhat complementary-shaped receptacle for tongue 22. The flared portions at 88 and 89 engage with ridged grip surfaces 84 and 85 for a smooth, nonbinding engagement between grip 82 and cover 65. The dimensions of cover 65 are selected so that tongue 22 is supported at the desired user access position, that is, a position ergonomically convenient for the seat occupant to grasp tongue 22 from its retracted position shown in FIGS. 2 and 5. Cover 65 thereby acts both as a protecting cover for brackets 31 and 32 and roller 34 and as a holder for tongue 22 in its retracted position. Likewise, cover 41 acts both as a protecting cover for brackets 27 and 28 and roller 29 and as a holder to support buckle 44 in a desired user access position.

In practice, seat belt module assembly 11 is mounted to a vehicle seat 10 as follows:

Seat belt module assembly 11 is substantially preassembled with tensioning system assembly 18 and retractor assembly 19 fixed to the bottom of frame 17 as described herein. Inner plates 40 and 64 are also secured to their respective upstanding legs, 25 and 26, respectively, by fasteners 58. At this stage, the short length of webbing 39 and its connected buckle 44 are dangling from one end of frame 17 while webbing 35 and its connected tongue 22 are retracted, in a position proximal to flared end 36 of retractor assembly 19. Module assembly 11 is manipulated to the desired position relative to the seat frame 12, whereby standing legs 25 and 26 are juxtaposed just to the outside of seat frame 12.

Neither cover 41 or 65 is attached yet to assembly 11, and the holes 30 of legs 25 and 26 are both accessible. With appropriate holes prepared in seat frame 12, the module assembly 11 is positioned and appropriate fasteners such as machine bolts 90 are passed through the holes 30 of each leg 25 and 26 and nuts 91 are secured thereon. Module assembly 17 is thereby rigidly secured to seat frame 12. The heads of bolts 90 are provided adequate clearance relative to inner plates 40 and 64 by the U-shaped slots 61 and 79, respectively. In this way, frame 17 may be secured to seat frame 12 before inner plates 40 and 64 are attached.

With frame 17 secured to seat frame 12, webbing 39 and its buckle 44 are lifted up to their vertical extreme and cover 41 is positioned aside inner plate 40 and pushed thereagainst so that leading ends 57 of fasteners 58 extend through and lockingly engage with holes 49 and 50 of cover 41.

Likewise, tongue 22 is grasped, and pulled until enough webbing 35 is paid out by retractor assembly 19 to permit cover 65 to be pressed against inner plate 64 until fasteners 58 engage with and hold cover 65. Tongue 22 may then be released, retractor assembly 19 retracting the webbing 35 until grip 82 engages with and seats in tongue sleeve assembly 20. It should be noted that ridges 87 of grip surfaces 84 and 85 assist not only in grasping tongue 22, but also in providing a smooth and nonbinding engagement with the receptacle created by tongue sleeve assembly 20.

An alternative embodiment is contemplated wherein one or both of the sleeve assemblies 20 and 21 are defined as one-piece units having a slit along one side. After frame 17 is mounted to seat frame 12, such one-piece unit could then be snapped in place against the relative upstanding leg of frame 17, and the corresponding buckle or tongue and its webbing could be positioned in place by sliding the webbing through the slot at the side of the respective sleeve assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A seat belt assembly for mounting to a vehicle seat having a vehicle seat frame comprising:

a U-shaped wall having a horizontal portion positioned beneath said seat and opposite vertical end portions positioned on opposite sides of said seat adjacent said seat frame, said vertical end portions joined to said horizontal portion at junctions and including fastener openings and first cover openings;

first fastener means extending through said fastener openings of said vertical end portions and fastening said U-shaped wall to said seat frame;

retractor means mounted to and beneath said horizontal portion and opening outwardly to allow a belt to extend therefrom;

tensioning means mounted to and beneath said horizontal portion and opening outwardly in a direction oppositely of said retractor means to allow a belt to extend therefrom;

a pair of belts having distal ends and being mounted adjacent and beneath said horizontal portion by said retractor means and said tensioning means and extending therefrom;

roller means mounted to said U-shaped wall and positioned at said junctions of said horizontal portion with said roller means operable to guide said belts from said retractor means and said tensioning means to said vertical end portions;

a tongue and buckle mounted to said distal ends of said belts;

a pair of vertical covers positioned outwardly of and to said vertical end portions with said pair of belts extending therebetween with said tongue and said buckle stored when not in use between said pair of vertical covers and said vertical end portions, said pair of vertical covers include second cover openings aligned with said first cover openings, said vertical covers concealing said first fastener openings and said first fastener means, said vertical covers being sized and selected to receive said tongue and said buckle at the desired elevation; and, second fastening means extending through said first cover openings and said second cover openings to secure said covers to said vertical end portions after said first fastening means have secured said U-shaped wall to said seat frame.

2. The assembly of claim 1 and further comprising:

a pair of vertical plates positioned between said belts and said vertical end portions with said plates having additional cover openings aligned with said first cover openings and said second cover openings and further with said second fastener means extending through said additional cover openings, said vertical plates having openings aligned with said fastener openings to allow access to said first fastener means, said vertical plates being vertically sized with said pair of covers to receive said tongue and said buckle at the desired elevation.

* * * * *